US006677738B1

(12) United States Patent
Hesse

(10) Patent No.: US 6,677,738 B1
(45) Date of Patent: Jan. 13, 2004

(54) OVERCURRENT SENSING USING HIGH SIDE SWITCH DEVICE IN SWITCHING POWER CONVERTERS

(75) Inventor: Kurt F. Hesse, Benson, NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/226,445

(22) Filed: Aug. 23, 2002

(51) Int. Cl.[7] .............................. G05F 1/40; H02H 7/00
(52) U.S. Cl. ......................... 323/284; 323/282; 361/18
(58) Field of Search ................................ 323/282, 283, 323/284, 285, 290, 364; 363/50; 361/18, 87, 93.9

(56) References Cited

U.S. PATENT DOCUMENTS

| 4,760,324 | A | * | 7/1988 | Underhill ..................... 323/282 |
| 5,877,611 | A | * | 3/1999 | Brkovic ....................... 323/222 |
| 6,166,526 | A | * | 12/2000 | Greitschus .................. 323/222 |
| 6,504,351 | B2 | * | 1/2003 | Eagar et al. ................ 323/282 |
| 6,541,948 | B1 | * | 4/2003 | Wong .......................... 323/284 |

* cited by examiner

Primary Examiner—Matthew V. Nguyen
(74) Attorney, Agent, or Firm—J. Dennis Moore; W. James Brady, III; Frederick J. Telecky, Jr.

(57) ABSTRACT

A DC-DC switching regulator, adapted to receive a pulsed signal. The regulator includes an inductor, and also includes a capacitor having one port connected to ground, and having a second port providing an output voltage of the DC-DC regulator. A driver is coupled to the inductor and adapted to drive pulses of current to the inductor when the pulsed signal is asserted. A rectifier is adapted to provide a path for the inductor to drive current to charge the first capacitor when the pulsed signal is not asserted. An overcurrent circuit is provided, adapted to sense a threshold current of the switching regulator corresponding to an overcurrent condition and to provide an overcurrent indication signal in response thereto. The overcurrent circuit includes a ringing compensation circuit adapted to control the overcurrent circuit threshold for providing the overcurrent indication signal from a first level to a subsequent second level less than the first level. The overcurrent circuit may also be provided with a delay circuit adapted to sense a predetermined enablement parameter, and in response to enable the overcurrent circuit.

15 Claims, 1 Drawing Sheet

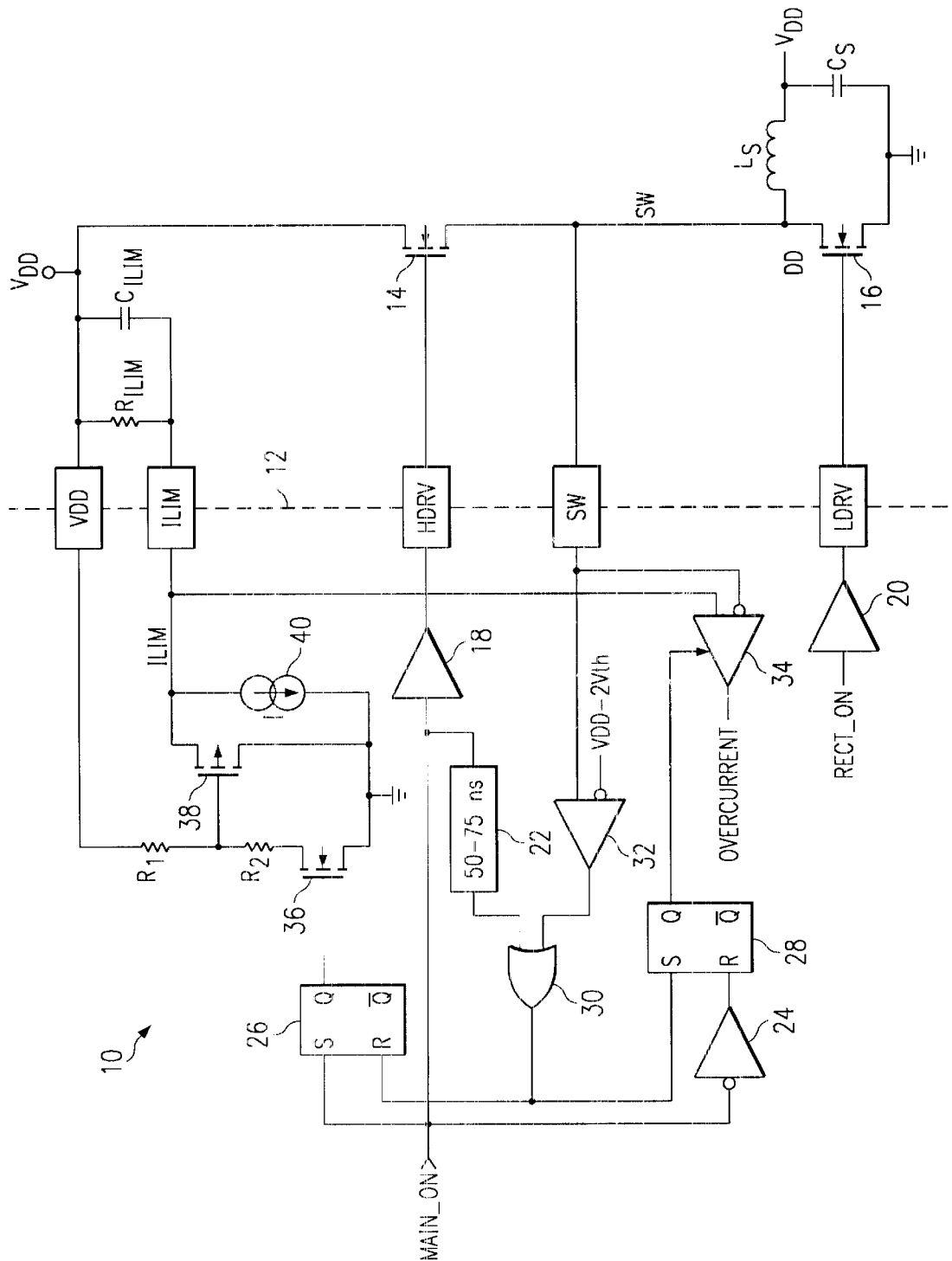

OVERCURRENT SENSING USING HIGH SIDE SWITCH DEVICE IN SWITCHING POWER CONVERTERS

TECHNICAL FIELD OF THE INVENTION

This invention relates to DC-DC switching regulators, and more particularly relates to improved overcurrent sensing for such regulators, for high speed operation.

BACKGROUND OF THE INVENTION

DC-DC switching regulators, or, converters, are circuits that use an inductor, a transformer, or a capacitor as an energy storage element to allow the transfer of energy from a switched element connected to its input to its output in discrete packets. One type of DC-DC switching regulator uses an inductor as an energy storage element supplying current to a capacitor used as a charge storage element at the output. The inductor and capacitor also serve as a filter for the output voltage. Feedback circuitry regulates the energy transfer from the switched element to the energy storage elements so as to maintain a relatively constant voltage across the charge storage element, within the load limits of the circuit.

DC-DC switching regulators can be configured to step up (boost) or step down (buck) the output voltage, or both, and can be configured to invert output voltage with respect to input voltage. A benefit of DC-DC switching regulators is their relatively high efficiency. In basic configurations, a so-called "freewheeling" diode, such as a Schottky-type diode, is used as a rectifier to allow current to flow from the current energy storage element to the charge storage element during the discharge phase of a cycle when the switching element is turned off, but which is reverse-biased during the charge phase of a cycle when the switching element is turned on. A typical operating frequency is on the order of 500 KHz, although the frequency is quite variable, depending on design considerations.

When DC-DC switching regulators are used in low output voltage applications, the power dissipation induced by the freewheeling diode of basic designs can be excessive. To alleviate this problem, a switch is sometimes used in the place of the freewheeling diode as the rectifier, and the resulting regulator is said to be synchronous. The switch is typically a power metal oxide semiconductor field effect transistor (MOSFET) device. In synchronous switching regulators, the switch that regulates the pulses of energy to the energy storage element is frequently called the high side switch, while the switch replacing the freewheeling diode is frequently called the low side switch. Since they are typically both power FET devices, they are called the high side device, or transistor, and low side device, or transistor, respectively. They are driven by a high side drive and a low side drive, respectively. The low side drive is the inverse of high side drive, usually with a dead zone, or, dead band, at transitions to prevent brief moments when both switches would otherwise be on at the same time.

DC-DC switching regulators typically have protection circuits included in their design. One type of protection circuit senses the approach of excessive operating current that could damage components in the regulator. When such excessive current is detected, an overcurrent sense signal is generated, and used to enter a protective mode. A commonly used overcurrent sense/protect circuit provides cycle-by-cycle current limiting when an overcurrent condition is sensed.

To provide cycle-by-cycle current limiting, switching regulators must sense operating current during the portion of the switching cycle when the energy source is connected to the energy storage element. For example, in a voltage mode buck converter, it is common to use either the "on" resistance of the high side device or a low value resistor in series with the high side device as a current sense element. The measured voltage across the resistance is used to compute the current. However, narrow pulse width switching regulators have an inherent problem sensing input current using the high side device or a resistor in series with it as the sense element. Parasitic ringing of the voltage at the switched node causes false or nuisance tripping of the overcurrent sense circuit, when the overcurrent voltage threshold is set at a normal level. On the other hand, if the overcurrent voltage threshold is set higher to avoid this, excessive or destructive current may flow before the overcurrent protection circuit is activated.

Another problem related to overcurrent sensing and protecting arises from the turn-on delays in power FETs. Because of such delays, a blanking time is frequently designed into overcurrent detection circuits, to ensure the high side device is actually on when the circuit monitors the voltage across it to determine if an overcurrent condition exists. If the device is not actually on, its impedance is very high and therefore a voltage is likely to exist across it that greatly exceeds the overcurrent voltage threshold. However, power FETs vary considerably in their turn-on delay times, and the resultant varying turn-on delays in switching regulators pose problems for setting the necessary blanking time for overcurrent detection. Propagation delays inside the controller only make the problem worse. As pulse widths get narrower, a fixed blanking time can be made to work reasonably well if adequate control of the switched node ringing is maintained, for example using snubber circuits and limiting the switching time with gate resistors in the main switch gate circuit. However, with very narrow pulse widths, such measures may be inadequate and the turn-on delays and propagation delays may be appreciable when compared to the nominal pulse width. This makes setting an effective generic overcurrent blanking time difficult.

SUMMARY OF THE INVENTION

It would therefore be desirable to have DC-DC switching converters operable with narrow drive pulse widths, for example in high frequency drive configurations, with improved overcurrent sensing. It would be desirable to have such converters in which the high side drive device can be used to sense voltage for overcurrent In accordance with the present invention there is provided a DC-DC switching regulator, adapted to receive a pulsed signal. The regulator includes an inductor, and also includes a capacitor having one port connected to ground, and having a second port providing an output voltage of the DC-DC regulator. A driver is coupled to the inductor and adapted to drive pulses of current to the inductor when the pulsed signal is asserted. A rectifier is adapted to provide a path for the inductor to drive current to charge the first capacitor when the pulsed signal is not asserted. An overcurrent circuit is provided, adapted to sense a threshold current of the switching regulator corresponding to an overcurrent condition and to provide an overcurrent indication signal in response thereto. The overcurrent circuit includes a ringing compensation circuit adapted to control the overcurrent circuit threshold for providing the overcurrent indication signal from a first level to a subsequent second level less than the first level. The overcurrent circuit may also be provided with a delay circuit adapted to sense a predetermined enablement parameter, and in response to enable the overcurrent circuit.

These and other features of the invention will be apparent to those skilled in the art from the following detailed description of the invention, taken together with the accompanying drawings.

BRIEF DESCRIPTION OF THE DRAWINGS

FIG. 1 is a circuit diagram of a preferred embodiment of the present invention.

DETAILED DESCRIPTION OF THE PREFERRED EMBODIMENT

The numerous innovative teachings of the present invention will be described with particular reference to the presently preferred exemplary embodiments. However, it should be understood that this class of embodiments provides only a few examples of the many advantageous uses and innovative teachings herein. In general, statements made in the specification of the present application do not necessarily delimit the invention, as set forth in different aspects in the various claims appended hereto. Moreover, some statements may apply to some inventive aspects, but not to others.

In general, the present invention improves overcurrent sensing in DC-DC switching regulators to which narrow drive pulses are applied, for example because of high drive frequencies. In embodiments of the present invention disclosed herein, overcurrent is sensed using the channel resistance of the high side FET device, although the invention is not limited to regulators using such a current sense technique. For example, it may be applied to switching regulators using a coupled winding on the inductor for current sensing. Further, although the embodiment shown in FIG. 1 is a buck regulator, the invention is applicable to a variety of DC-DC switching regulators, for example, boost and buck-boost regulators. Adaptation of the principles of the present invention to such alternative configurations is well within the scope of those of ordinary skill in the art, once the principles of the present invention, as described herein, are understood.

In accordance with the present invention, an overcurrent threshold is provided that starts at a high level and then decays to a predetermined, lower final level. This compensates for the parasitic ringing at the switched node. Thus, when the high side device is turned on, the current limit voltage threshold is increased to a relatively large value. At some later time during the switching period, the current limit threshold is allowed to return to the predetermined lower level. In some embodiments, this return to a predetermined lower level is done with the exponential decay of an R-C circuit, although any known circuit that controls the decay of current or voltage, as the case may be, may be used for this purpose. The use of an R-C circuit allows the compensation of the parasitic ringing to be controlled on a case-by-case basis, providing the ability to optimize overcurrent protection in a wide variety of applications. In embodiments disclosed herein, operating current is sensed by monitoring the voltage at the switched node with respect to the input voltage $V_{DD}$, and the overcurrent threshold is provided by providing a comparison voltage that starts at a high level (significantly lower than $V_{DD}$) and then decays to a predetermined, lower final level (closer to $V_{DD}$). However, the operating current may be sensed using other, known techniques. In such cases, their threshold would be adjusted similarly.

In addition, when the high side device is turned on a waiting period may be introduced until switch element has fully turned on, before starting to monitor the operating current in order to sense an overcurrent event. This waiting period is determined by sensing a predetermined operating parameter that relates to the turn-on of the high side device. In embodiments disclosed herein, the duration of the waiting period is determined by sensing when the voltage at the switched node has risen above a predetermined level. However, when the waiting period feature is provided, other operating parameters may be sensed using other, known techniques for determining turn-on of the high side device, and thereby, the waiting period. For example, the voltage at the gate of the high side device with respect to its source could be monitored. In any event, this compensates for the turn-on delay variation between differing applications, by ensuring that the turn-on delay time has expired. In combination with a decaying overcurrent threshold, this provides a highly effective overcurrent solution for narrow pulse width switching regulators using the high side switch as the sense element. FIG. 1 is a schematic diagram of a preferred embodiment 10 of the present invention. It is implemented partially in an integrated circuit ("IC") "chip," and partially off-chip, i.e., with components external to the IC. In the figure, components to the left of the dotted line 12 are in the IC, while those to the right are off-chip. It will be appreciated that this division is not important to the invention, but primarily reflects the current state of technology. It is conceivable that an embodiment may in a different technological context be entirely integrated, for example. The embodiment 10 is a DC-DC buck converter, but that is not to be considered limiting, as the invention can be implemented in a variety of switching converter types, as will be appreciated by those of ordinary skill in the art, once the principles of the present invention, as described herein, are understood.

An inductor $L_S$ is provided off-chip as an energy storage element, connected on one side to an output node providing voltage $V_{OUT}$. A capacitor $C_S$ is provided as another energy storage element between the output and electrical ground. A high side N-type power FET device 14 is connected at a switching node SW between the other side of $L_S$ and a power supply providing a voltage $V_{DD}$. The voltage $V_{DD}$ is provided to the IC at a VDD pin. A low side N-type power FET device 16 is connected between node SW and ground. Device 14 receives a high side drive signal at its gate from an HDRV pin on the IC from a buffer 18 on the IC (power supply for the driver 18 is not shown, but is bootstrapped onto node SW), while device 16 receives a low side drive signal at its gate from an LDRV pin on the IC. The switching node SW is connected to a SW pin on the IC, to allow circuitry in the IC to monitor the voltage at node SW.

The high side drive signal is provided by circuitry elsewhere on the IC of known configuration, as signal MAIN_ON. This signal is buffered by buffer 18, and the buffered signal is provided to the HDRV pin as the high side drive signal. Likewise, the low side drive signal is provided by circuitry elsewhere on the IC of known construction, as signal RECT_ON. This signal is buffered by buffer 20, and the buffered signal is provided to the LDRV pin as the low side drive signal.

The MAIN_ON signal is also applied to the input of a timer 22 operating as a delay element, having a time-out period of 50–75 ns. The MAIN_ON signal is also connected to the input of an inverter 24, and to the set input of a first set-reset ("SR") flip-flop 26. The output of inverter 24 is connected to the reset input of a second SR flip-flop 28. The output of the timer 22 is provided to a first input of an OR gate 30. The SW pin on the IC is connected to the non-inverting input of a first comparator 32 and to the inverting input of a second comparator 34. The inverting input of comparator 32 receives a voltage equal to $V_{DD}$, less two times the threshold voltage of an internal MOSFET (not shown), typically about 2 volts (other voltages could be used, e.g., 1*Vth, $V_{DD}$/2, etc., depending on the application and problems associated with the particular application), i.e., $V_{DD}$–2Vth. The output of comparator 32 is connected to the second input of OR gate 30. The output of OR gate 30 is connected to the reset input of SR flip-flop 26 and to the set input of SR flip-flop 28. The non-inverting input of comparator 34 receives a voltage ILIM from an ILIM pin of the IC (also, node ILIM), while a control port of comparator 34 is connected to the Q output of SR flip-flop 28.

Q output of SR flip-flop 26 is connected to the gate of an N-type MOSFET device 36. A resistive divider is provided by resistor $R_1$ and $R_2$ connected in series between $V_{DD}$ and the drain of device 36. The source of device 36 is connected to ground. The common connection node of resistors $R_1$ and $R_2$ is connected to the gate of a P-type MOSFET device 38 having its drain connected to ground. The source of device 38 is connected to the node ILIM. A current source 40 is connected to sink current I from the ILIM pin to ground. Externally, a resistor $R_{ILIM}$ and a capacitor $C_{ILIM}$ are connected in parallel between the $V_{DD}$ pin and the ILIM pin of the IC.

In operation, the circuit 10 operates as follows. In general, the base overcurrent threshold is determined by a current source that pulls a fixed current through resistor $R_{ILIM}$ connected to $V_{DD}$. The bottom end of this resistor, which is connected to the node ILIM, sets the nominal, or threshold, voltage, ILIM, that is used for comparison to the switched node for purposes of determining an overcurrent condition. The capacitor $C_{ILIM}$ is placed in parallel with the resistor $R_{ILIM}$ and their values are selected so that the RC time constant formed by the two is approximately the same as the ringing decay on the switched node, SW.

A delay for operation of the overcurrent circuit is determined by waiting until the switched node achieves a predetermined voltage, which may be denominated an enablement voltage, and which in this embodiment is $V_{DD}$–2Vth. An optional timer is provided to enable the overcurrent circuit for operation after a predetermined time, for example, 50–75 ns; this ensures that the overcurrent circuit will be on when an actual overcurrent condition occurs, following a reasonable turn-on time for device 14. In this regard, note that the enablement voltage will typically be set to a value well below the ILIM voltage. If the voltage at node SW does not reach the enablement voltage by the time a relatively steady state has been achieved, a serious fault is likely to have occurred, in which case the converter should be turned off. The timer ensures that the overcurrent circuit is turned on under such conditions, allowing it to turn off the converter.

Specifically, before the high side portion of a cycle, the Q output of SR flip-flop 26 is low, maintaining device 36 in an off state. As a result, the voltage at the gate of device 38 is maintained high, keeping device 38 off. Thus, only current source 40 draws current from the ILIM pin of the IC, maintaining it at a steady voltage, as described below. When the signal MAIN_ON goes high, commanding device 14 to turn on, beginning the high side portion of a cycle, SR latch 26 is triggered, turning device 36 on, and pulling the gate of device 38 to approximately $V_{DD}$/2, turning it on, as well. Device 38 is configured as a source follower, and so acts as a voltage-clamp for the node ILIM. This brings the voltage ILIM down to a level of approximately ($V_{DD}$/2)+Vth, and holds it at substantially that level. Note that since there is a delay through devices 14 (the inherent turn-on delay) and 16 (the driver propagation delay), and this delay is longer than the delay through SR latch 26 and devices 36 and 38, the voltage ILIM is pulled low before the voltage on the switched node SW rises. During this time, the Q output of flip-flop 28 is low, and so comparator 34 is not enabled, i.e., overcurrent sensing is disabled.

When the switched node SW rises to $V_{DD}$–2Vth, the output of comparator 32 goes high. In addition, after a maximum delay of 50–75 ns after the signal MAIN_ON is asserted, timer 22 times out. When either of these events occurs, the output of OR gate 30 goes high, setting flip-flop 28, causing its Q output to go high and thereby enabling comparator 34, i.e., enabling overcurrent sensing. In this way, a waiting period is provided to compensate for the turn-on delay variation between differing applications as described above.

Upon expiration of the waiting period, the output of OR gate 30 also resets SR flip-flop 26, causing its Q output to go low, turning off devices 36 and 38, allowing the voltage ILIM to return to its base voltage determined by the current I flowing through resistor $R_{ILIM}$, at a rate determined by the RC time constant of capacitor $C_{ILIM}$ and resistor $R_{ILIM}$. In this way, the threshold for comparator 34 is controlled to compensate for the parasitic ringing at the switched node SW as described above. Note that while the threshold voltage ILIM goes from a low level to a high level during the initial ringing compensation period, because comparator 34 is a differential comparator, this effects a change in the current threshold that is being represented by the voltage at node SW from high to low.

At the end of the assertion of the signal MAIN_ON, the output of inverter 24 goes high, thus causing SR flip-flop 28 to reset. This causes the Q output of SR flip-flop 28 to go low, disabling comparator 34, i.e., disabling overcurrent sensing, thus completing the cycle.

Although the present invention and its advantages have been described in detail, it should be understood that various changes, substitutions and alterations can be made herein without departing from the spirit and scope of the invention as defined by the appended claims.

What is claimed is:

1. A DC-DC switching regulator, adapted to receive a pulsed signal, comprising:
    an inductor;
    a first capacitor having one port connected to ground, and having a second port providing an output voltage of the DC-DC regulator;
    a driver coupled to the inductor and adapted to drive pulses of current to the inductor when the pulsed signal is asserted;
    a rectifier adapted to provide a path for the inductor to drive current to charge the first capacitor when the pulsed signal is not asserted; and
    an overcurrent circuit adapted to sense a threshold current of the switching regulator corresponding to an overcurrent condition and to provide an overcurrent indication signal in response thereto, including a ringing compensation circuit adapted to control the overcurrent circuit threshold for providing the overcurrent indication signal from a first level to a subsequent second level less than the first level.

2. A switching regulator according to claim 1, wherein the overcurrent circuit further comprises a delay circuit adapted to sense a predetermined enablement parameter, and in response thereto to enable the overcurrent circuit for sensing an overcurrent condition.

3. A switching regulator according to claim 2, wherein the predetermined enablement parameter comprises an enablement current of the switching regulator.

4. A switching regulator according to claim 3, wherein the enablement current of the switching regulator is less than the threshold current of the switching regulator.

5. A switching regulator according to claim 4, wherein the threshold current and the enablement current of the switching regulator are sensed by sensing threshold and enablement voltages, respectively, at a switched node of the driver coupled to the inductor when the driver is driving current to the inductor.

6. A switching regulator according to claim 5, wherein the driver comprises a FET, and wherein the switched node comprises a drain or source, as the case may be, of the FET, connected to the inductor.

7. A switching regulator according to claim 6, wherein the delay circuit comprises a comparator having a first input connected to the switched node, having a second input connected to a reference voltage at a level corresponding to the enablement voltage, and having an output adapted to enable the overcurrent circuit when the voltage at the first input is higher than the voltage at the second input.

8. A switching regulator according to claim 7, further comprising a timer adapted to provide a timer signal a predetermined interval following the assertion of the pulsed signal, and wherein the timer signal is adapted to enable the overcurrent circuit.

9. A switching regulator according to claim 1, wherein the threshold current of the switching regulator is sensed by sensing a threshold voltage at a switched node of the driver coupled to the inductor when the driver is driving current to the inductor.

10. A switching regulator according to claim 9, wherein the ringing compensation circuit comprises a comparator having a first input connected to the switched node, having a second input connected to a reference voltage source adapted to be controlled from the first voltage level to the subsequent second voltage level less than the first voltage level, and having an output providing the overcurrent indication signal.

11. A switching regulator according to claim 10, wherein the reference voltage source comprises:

a resistor connected between a supply voltage and a reference node providing the reference voltage;

a second capacitor connected in parallel with the resistor; and circuitry adapted to activate the reference node at the first voltage level in response to a pulsed signal and to draw current through the resistor and the second capacitor to cause the reference node to change in voltage from the first voltage level to the second voltage level in accordance with a time constant of the resistor and second capacitor.

12. A switching regulator according to claim 11 wherein the values of the resistor and the second capacitor are selected to provide the time constant corresponding to a ringing characteristic of the switched node.

13. A switching regulator according to claim 12, wherein the circuitry adapted to activate the reference node comprises:

a first current source adapted to draw current through the resistor at a level that causes the reference node to be at the second voltage level;

a second current source adapted to draw current through the resistor at a level that, in combination with the current drawn by the first current source, causes the reference node to be at the first voltage level; and switching circuitry adapted to stop the second current source from drawing current through the resistor and second capacitor at a start time for activating the overcurrent circuit.

14. A switching regulator according to claim 13, wherein the second current source comprises a voltage clamp circuit.

15. A switching regulator according to claim 14, wherein the voltage clamp circuit comprises an FET device connected as a source follower.

* * * * *